(12) United States Patent
Belitz et al.

(10) Patent No.: US 11,708,020 B2
(45) Date of Patent: Jul. 25, 2023

(54) LIGHTING UNIT WITH ELECTRONICALLY MODULATED BEAM CONFIGURATION

(71) Applicant: Federal Signal Corporation, Oak Brook, IL (US)

(72) Inventors: Duane P. Belitz, Frankfort, IL (US); Robert A. Czajkowski, Tinley Park, IL (US); Robert J. Hartke, Beecher, IL (US); Jeffery M. Loftus, Tinley Park, IL (US); Tim Skertich, Jr., Crown Point, IN (US); Aaron Sowers, Tinley Park, IL (US); Adam Voss, Griffith, IN (US)

(73) Assignee: Federal Signal Corporation, Oak Brook, IL (US)

( * ) Notice: Subject to any disclaimer, the term of this patent is extended or adjusted under 35 U.S.C. 154(b) by 0 days.

(21) Appl. No.: 17/577,748

(22) Filed: Jan. 18, 2022

(65) Prior Publication Data
US 2022/0227287 A1    Jul. 21, 2022

Related U.S. Application Data

(60) Provisional application No. 63/139,142, filed on Jan. 19, 2021.

(51) Int. Cl.
| | |
|---|---|
| *B60Q 1/24* | (2006.01) |
| *B60Q 1/076* | (2006.01) |
| *F21V 21/15* | (2006.01) |
| *F21V 14/02* | (2006.01) |
| *H05B 47/18* | (2020.01) |

(Continued)

(52) U.S. Cl.
CPC ............. *B60Q 1/245* (2013.01); *B60Q 1/076* (2013.01); *F21S 41/645* (2018.01); *F21V 14/003* (2013.01); *F21V 14/025* (2013.01); *F21V 21/15* (2013.01); *F21V 21/30* (2013.01); *H05B 47/18* (2020.01); *F21Y 2115/10* (2016.08)

(58) Field of Classification Search
CPC ....... B60Q 1/245; B60Q 1/076; F21S 41/645; F21V 14/003
See application file for complete search history.

(56) References Cited

U.S. PATENT DOCUMENTS

| | | |
|---|---|---|
| 3,784,809 A | 1/1974 | Smith |
| 5,490,046 A | 2/1996 | Gohl |

(Continued)

FOREIGN PATENT DOCUMENTS

| | | |
|---|---|---|
| CN | 306599727 | 6/2021 |
| EP | 2297747 A2 | 3/2011 |

OTHER PUBLICATIONS

Federal Signal Corporation Visibeam Series, https://worktruck.fedsig.com/product/visibeam-series, copyright 2020, 6 pages.

(Continued)

*Primary Examiner* — William N Harris
(74) *Attorney, Agent, or Firm* — Merchant & Gould P.C.

(57) ABSTRACT

Lighting unit that can be mounted to a vehicle for illuminating work or emergency areas at night. The lighting unit includes a mechanically controllable driver for selecting a position of a central optical axis of the light emitter and an electronically adjustable refractive element for modulating a beam spread configuration generated by the lighting unit.

20 Claims, 12 Drawing Sheets

(51) Int. Cl.
*F21V 21/30* (2006.01)
*F21S 41/64* (2018.01)
*F21V 14/00* (2018.01)
*F21Y 115/10* (2016.01)

(56) References Cited

U.S. PATENT DOCUMENTS

| | | | |
|---|---|---|---|
| 5,584,560 A | 12/1996 | Gosswiller et al. | |
| 5,673,989 A | 10/1997 | Gohl | |
| 5,806,956 A * | 9/1998 | Hyun-Jo | F21V 17/02 |
| | | | 362/385 |
| D515,228 S | 2/2006 | Gebhard | |
| D520,548 S | 5/2006 | Tsai | |
| 7,296,917 B1 * | 11/2007 | Chiu | B60Q 1/245 |
| | | | 362/512 |
| D556,803 S | 12/2007 | Ishida | |
| D575,424 S | 8/2008 | Gebhard | |
| D582,084 S | 12/2008 | Gebhard | |
| D592,088 S | 5/2009 | Miller | |
| D598,799 S | 8/2009 | Shigematsu | |
| D612,760 S | 3/2010 | Chen et al. | |
| 7,789,525 B2 | 9/2010 | Vinther | |
| D664,285 S | 7/2012 | Toft | |
| D666,346 S | 8/2012 | Gebhard | |
| D694,928 S | 12/2013 | Chen | |
| D710,042 S | 7/2014 | Georgitsis et al. | |
| 8,786,422 B2 * | 7/2014 | Wang | B60Q 1/245 |
| | | | 340/471 |
| D716,863 S | 11/2014 | Zutell et al. | |
| 9,036,102 B2 | 5/2015 | Galstian | |
| D734,521 S | 7/2015 | Gebhard | |
| D734,887 S | 7/2015 | Gebhard | |
| D736,430 S | 8/2015 | Ko | |
| D745,990 S | 12/2015 | Gebhard | |
| 9,255,687 B2 | 2/2016 | Gebhard | |
| 9,409,512 B2 | 8/2016 | Stein et al. | |
| 9,423,090 B1 | 8/2016 | Deyaf | |
| 9,423,092 B1 | 8/2016 | Deyaf | |
| D772,446 S | 11/2016 | Largent | |
| D827,899 S | 9/2018 | Li | |
| 10,330,295 B1 | 6/2019 | Uke | |
| D861,202 S | 9/2019 | Renvall | |
| D866,034 S | 11/2019 | Fujisawa | |
| D898,265 S | 10/2020 | Bao | |
| 11,059,416 B1 * | 7/2021 | Kulkarni | B60Q 1/1438 |
| D930,214 S | 9/2021 | Kallestrup | |
| D974,212 S | 1/2023 | Belitz et al. | |
| 2008/0062692 A1 | 3/2008 | Andersen et al. | |
| 2009/0323364 A1 | 12/2009 | Bornhorst et al. | |
| 2010/0067226 A1 | 3/2010 | Higuchi et al. | |
| 2011/0090415 A1 | 4/2011 | Asatryan | |
| 2011/0216257 A1 | 9/2011 | Galstian | |
| 2011/0261568 A1 | 10/2011 | Dalsgaard | |
| 2018/0156430 A1 | 6/2018 | Johansen | |
| 2020/0393105 A1 * | 12/2020 | Lin | F21S 41/153 |
| 2021/0010657 A1 * | 1/2021 | Li | G02F 1/133512 |
| 2022/0120404 A1 * | 4/2022 | Murugesan | F21S 41/141 |

OTHER PUBLICATIONS

LensVector, Adaptive molecular optics enabling new photonic solutions, https://www.lensvector.com/, copyright 2020, 3 pages.
LensVector, Products, https://www.lensvector.com/products/, copyright 2020, 2 pages.
Feniex, AI Cube, https://www.feniex.com/scene-lights/ai-cube, copyright 2021, 3 pages.
Ecco, EW3010 Series, https://www.eccoesg.com/us/en/products/worklights/heavy-duty-worklights/ew3010-series, copyright 2022, 4 pages.
Golight, Remote Control Lights, https://golight.com/remote-lights/?ia_cat=remote-control-light, accessed Jan. 19, 2021, 43 pages.
NightSpire Brochure, published brochure from Federal Signal Corporation 2021, retrieved from internet Jun. 22, 2022. <URL: https://zips.com/docs/default-source/parts-brochures/federal-signal/federal-signal-night-spire-brochure.pdf> (Year: 2021).

* cited by examiner

LIGHTING UNIT WITH ELECTRONICALLY MODULATED BEAM CONFIGURATION

BACKGROUND

High luminosity lighting units are provided for utility vehicles and emergency vehicles to illuminate areas at night, such as emergency sites, construction sites and other work sites. Such lighting units are generally configured to provide high luminosity, for example in the range of 5,000 to 10,000 lumens, or greater. Multiple lighting units may be required for different illumination applications, the size of the area to be illuminated, and the required light intensity. For example, a spotlighting unit may be used to generate a tightly focused intense light beam on a relatively small area, a work lighting unit may be used to generate a wider light beam than a spotlight, e.g., a light beam on the order of about 10 degrees, and a flood lighting unit may be used to generate a wider light beam than a work light. An example spotlight is described in U.S. Pat. No. 5,584,560, the contents of which are hereby incorporated by reference in its entirety.

SUMMARY

In general terms, the present disclosure is directed to vehicle-mountable lighting units having various light beam adjustability features.

According to certain aspects of the present disclosure a lighting unit includes: a base; a cover couplable to the base to define an interior volume of the lighting unit, the cover being configured to transmit light from the interior volume to an exterior of the lighting unit; a subunit positioned within the interior volume and arranged to pivot relative to the base and the cover about two pivot axes that are perpendicular to each other, the subunit defining a central optical axis and including: a light emitter; and an optics arrangement, including an electronically adjustable refractive element; and a controller configured to electronically modify refractive properties of the refractive element to modulate a beam spread, about the central optical axis, of a light beam emitted by the light emitter.

The details of one or more embodiments are set forth in the accompanying drawings and the description below. Other features, objects, and advantages of these embodiments will be apparent from the description, drawings, and claims. Moreover, it is to be understood that both the foregoing summary of the disclosure and the following detailed description are exemplary and intended to provide further explanation without limiting the scope of the disclosure as claimed.

DESCRIPTION OF THE DRAWINGS

The following figures, which form a part of this application, are illustrative of described technology and are not meant to limit the scope of the disclosure as claimed in any manner, which scope shall be based on the claims appended hereto.

DETAILED DESCRIPTION

Figure 1:
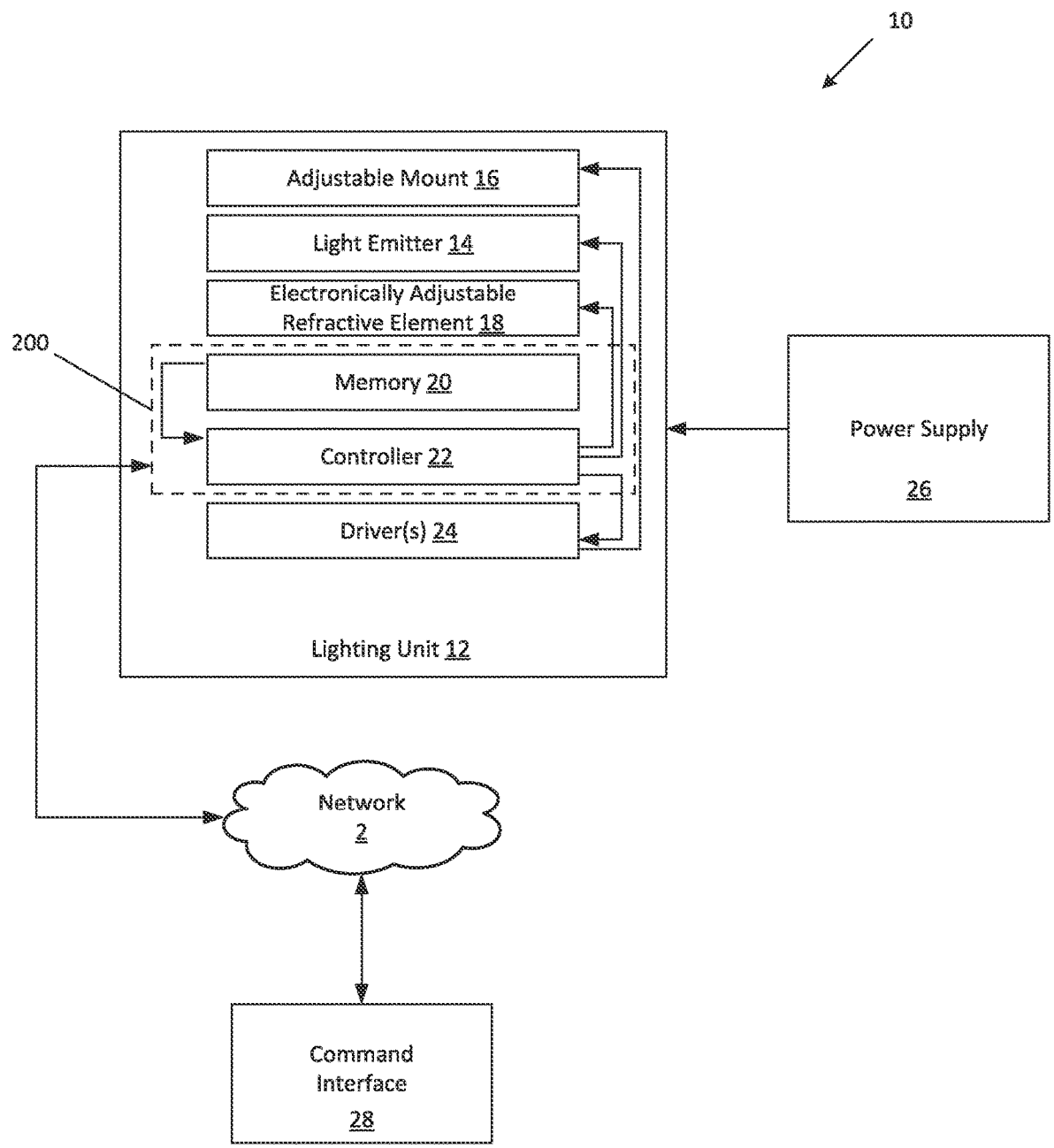
FIG. 1 is a schematic illustration of an example lighting unit system according to the present disclosure.
Figure 2:
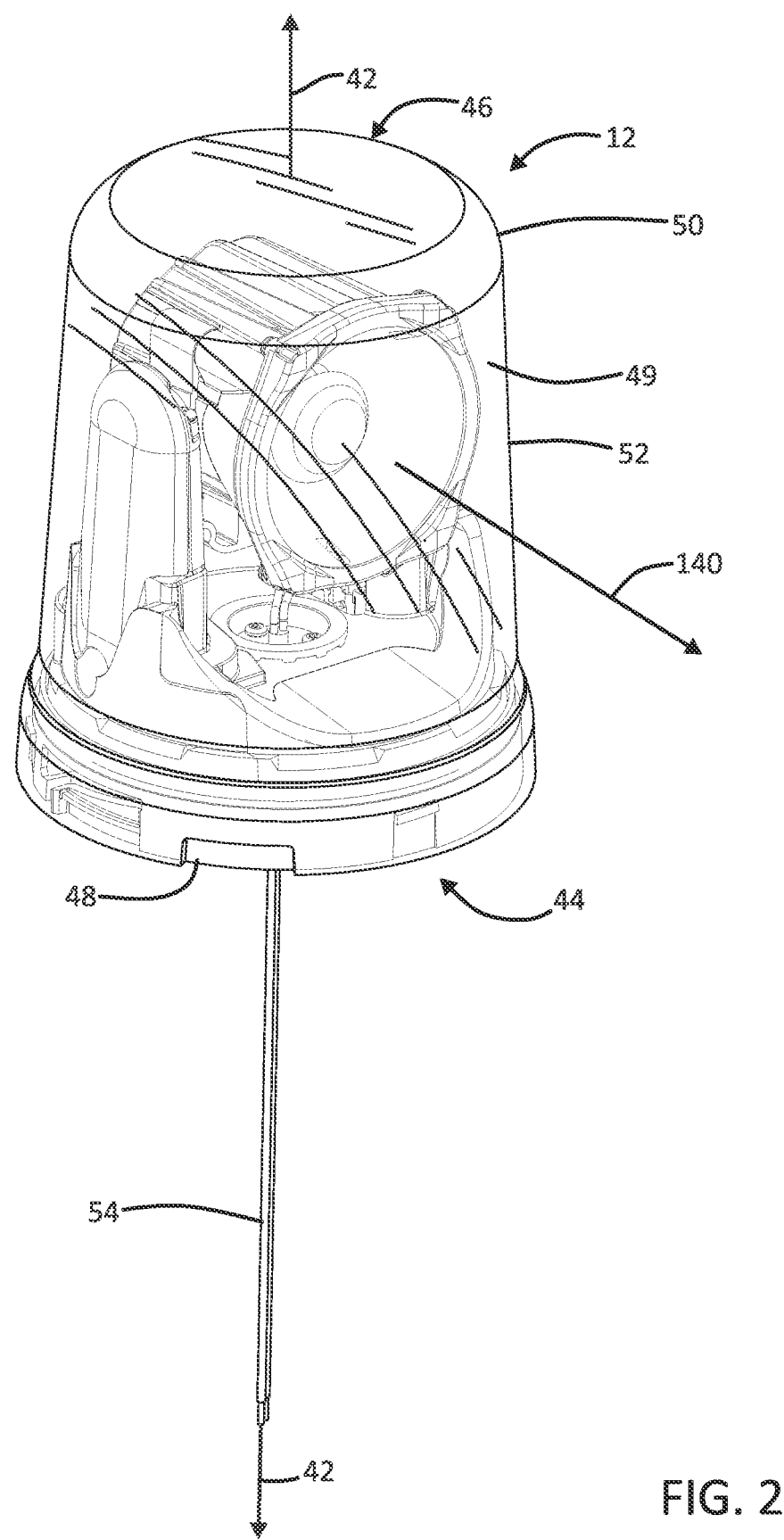
FIG. 2 is a perspective view of an example lighting unit of the system of FIG. 1.
Figure 3:
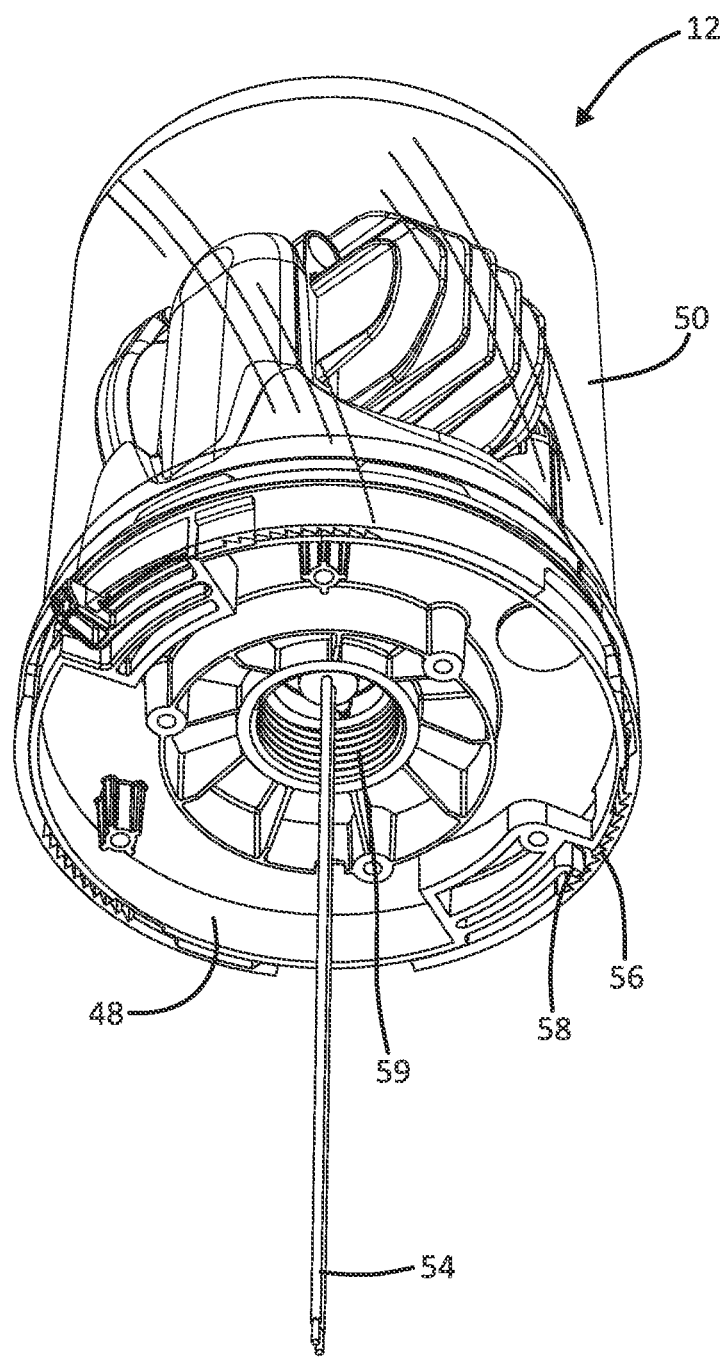
FIG. 3 is a further perspective view of the lighting unit of FIG. 3.
Figure 4:
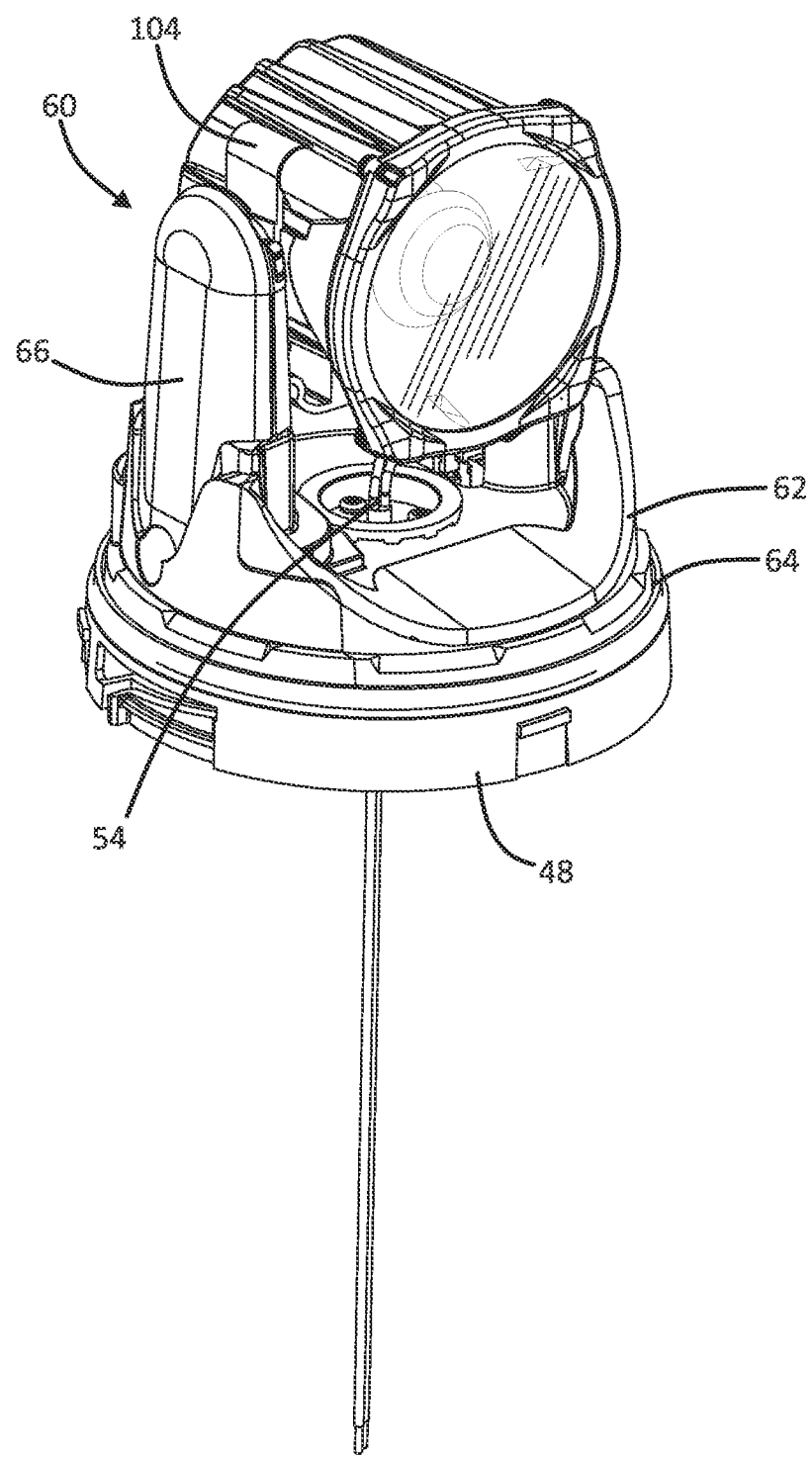
FIG. 4 is a perspective view of the lighting unit of FIG. 3, with the cover removed.
Figure 5:
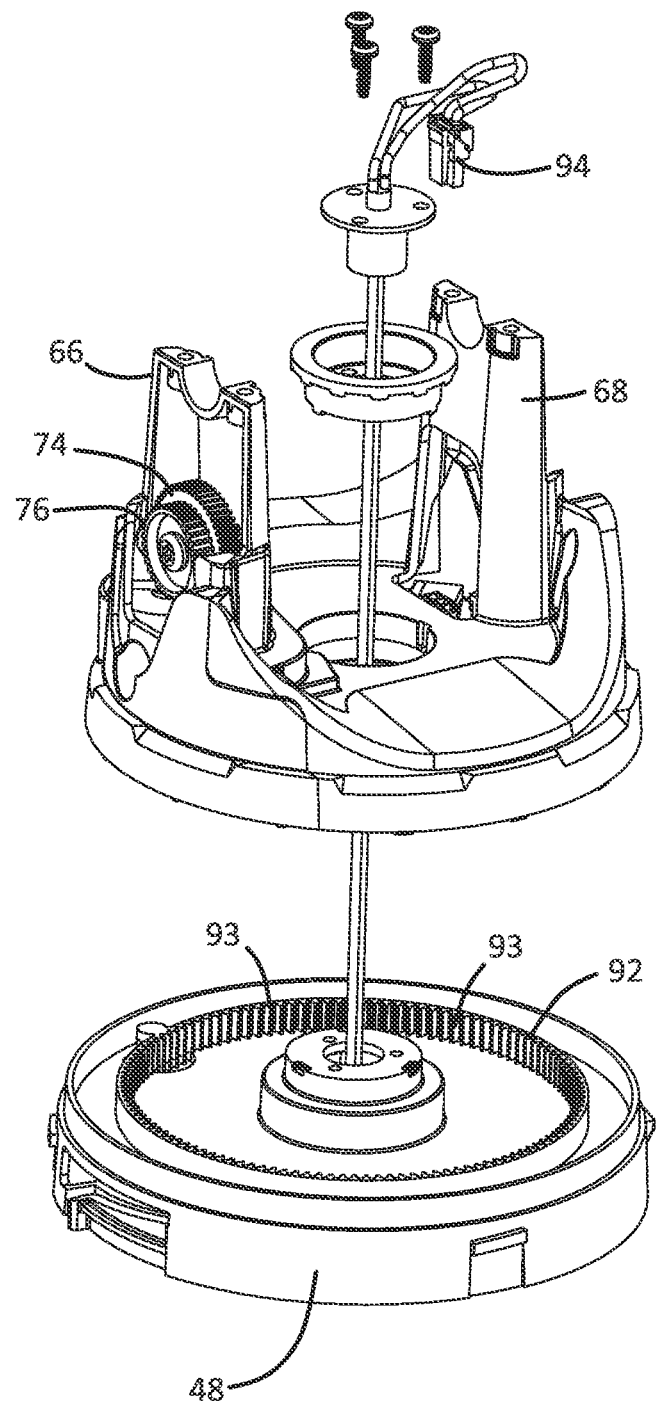
FIG. 5 is a partially exploded view of a portion of the lighting unit of FIG. 3.
Figure 6:
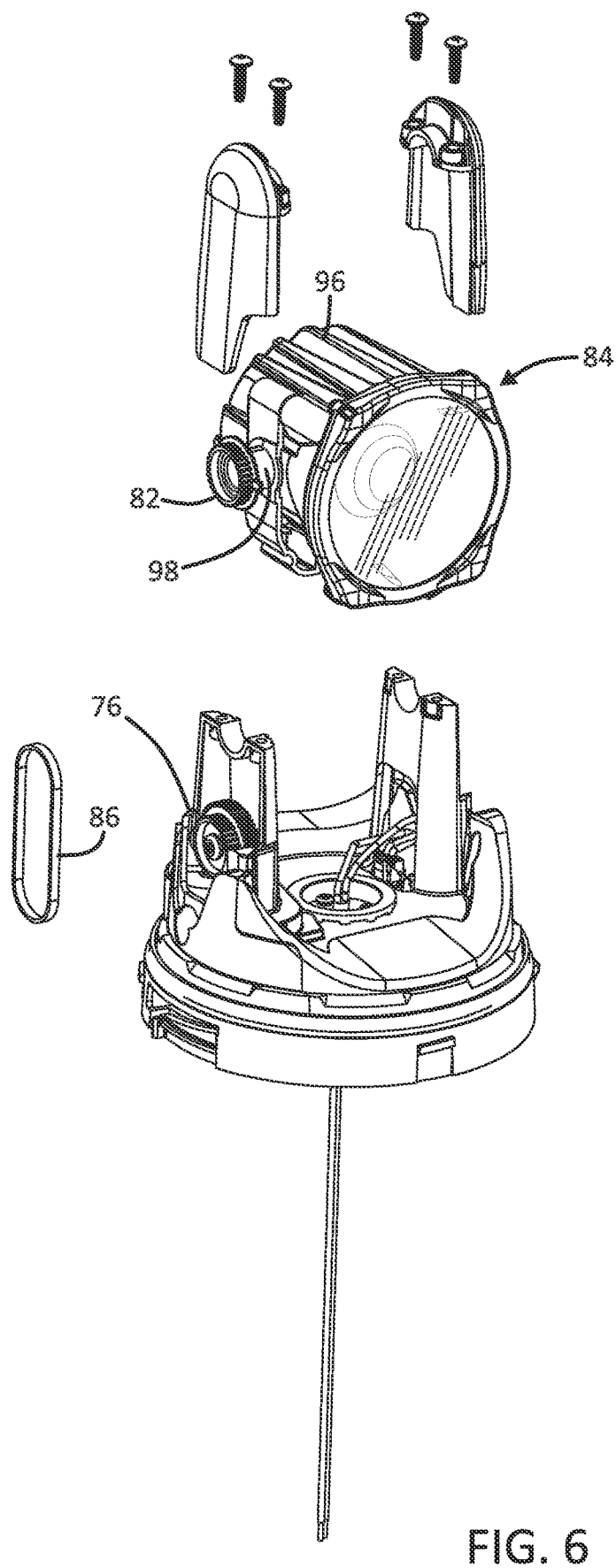
FIG. 6 is a partially exploded view of a further portion of the lighting unit of FIG. 3.
Figure 7:
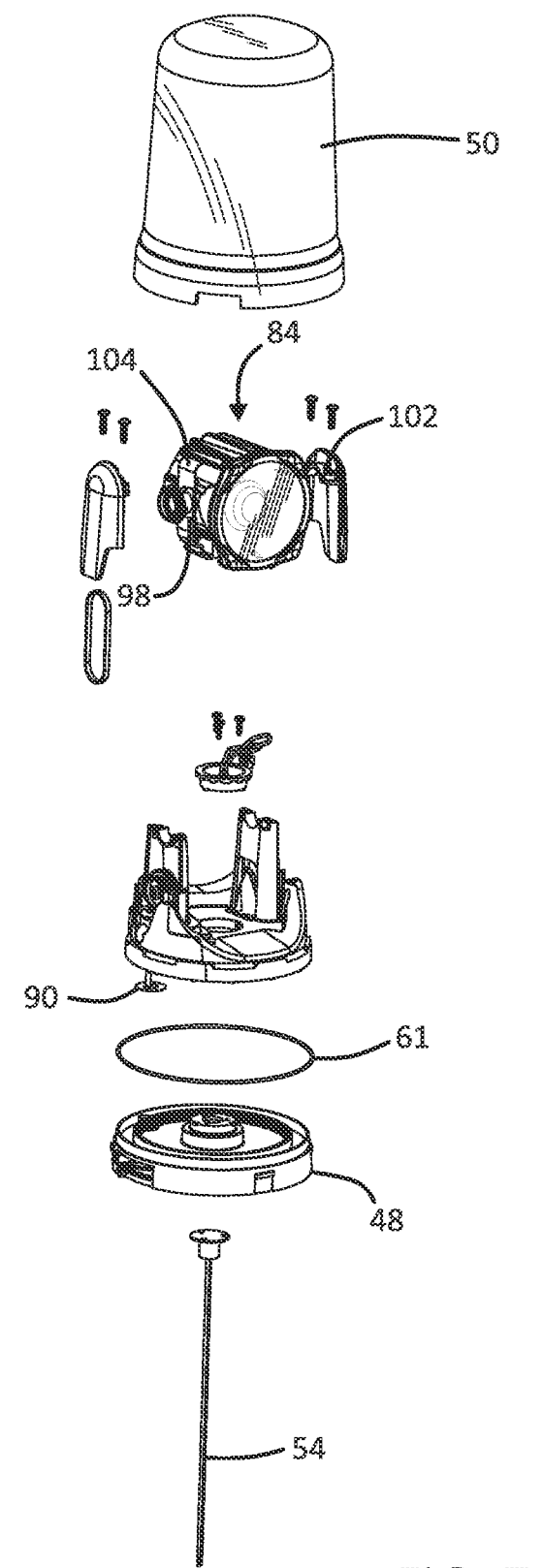
FIG. 7 is a partially exploded view of the lighting unit of FIG. 3.
Figure 8:
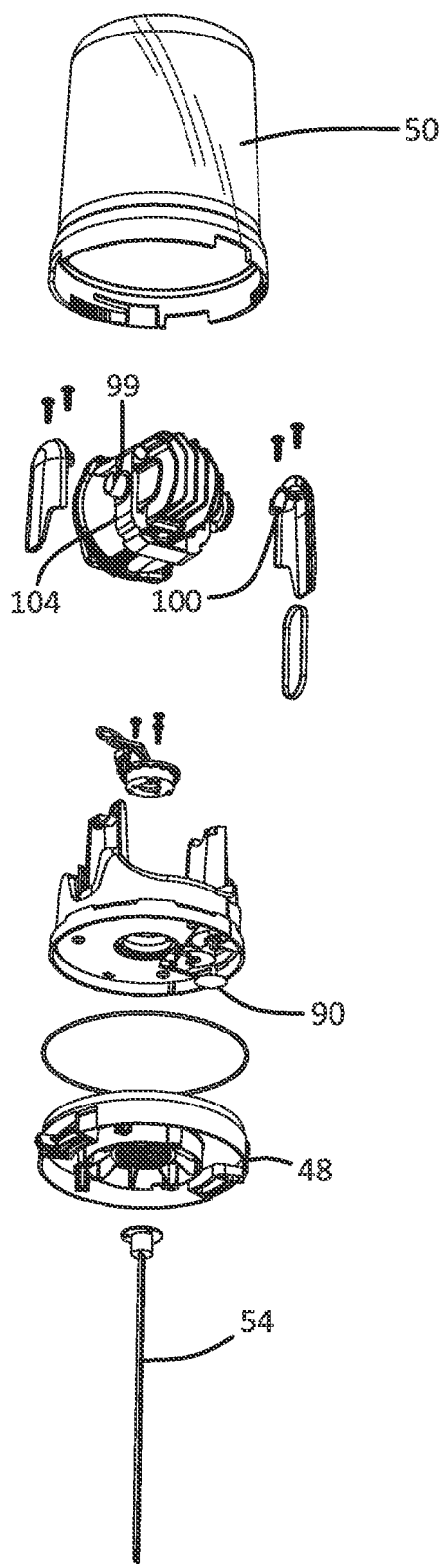
FIG. 8 is a further partially exploded view of the lighting unit of FIG. 3.
Figure 9:
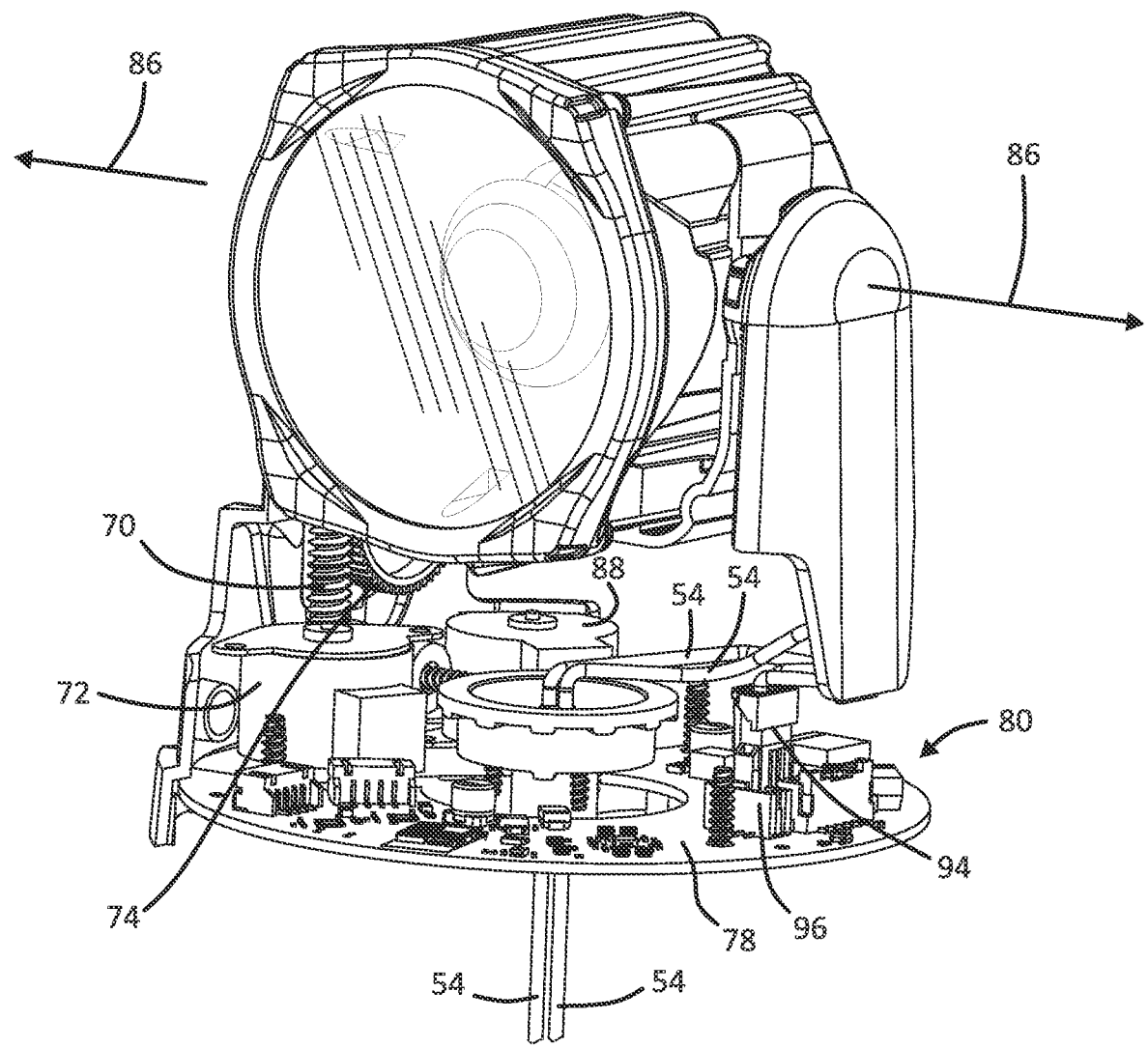
FIG. 9 is a perspective view of a portion of the lighting unit of FIG. 3.
Figure 10:
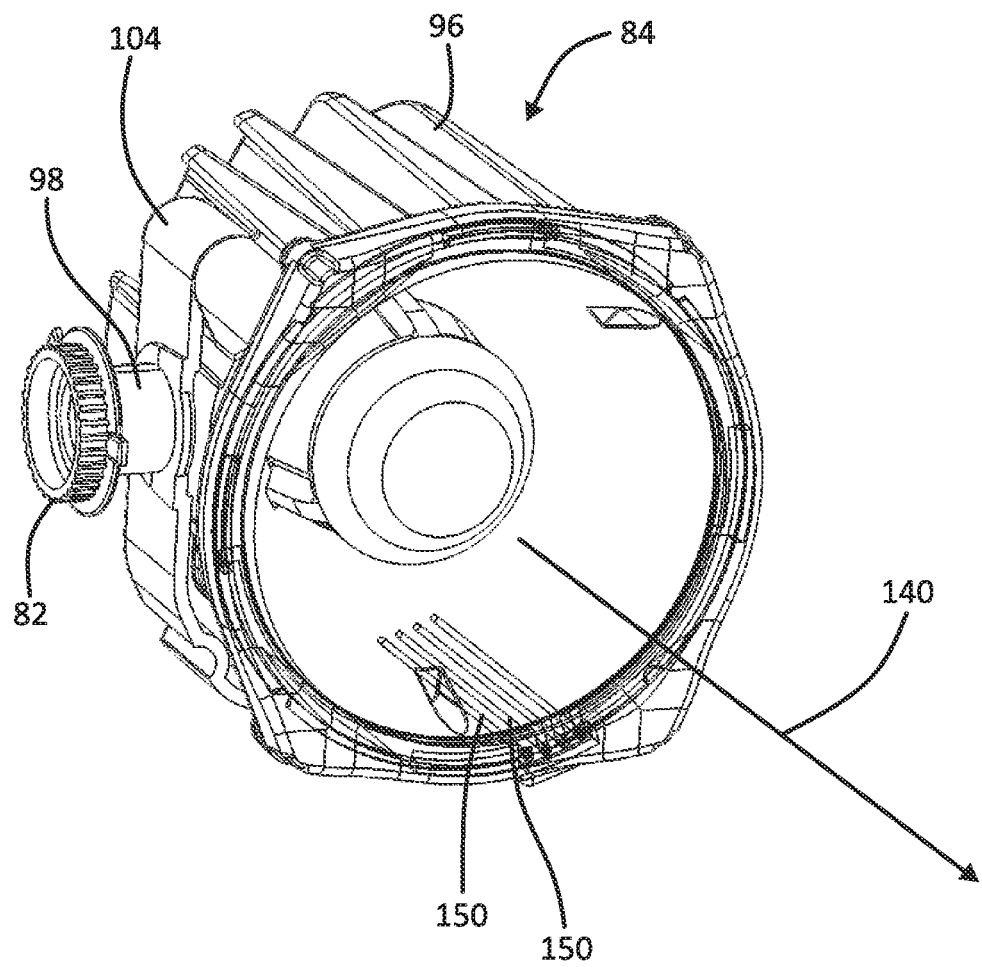
FIG. 10 is a perspective view of a subunit of the lighting unit of FIG. 3.
Figure 11:
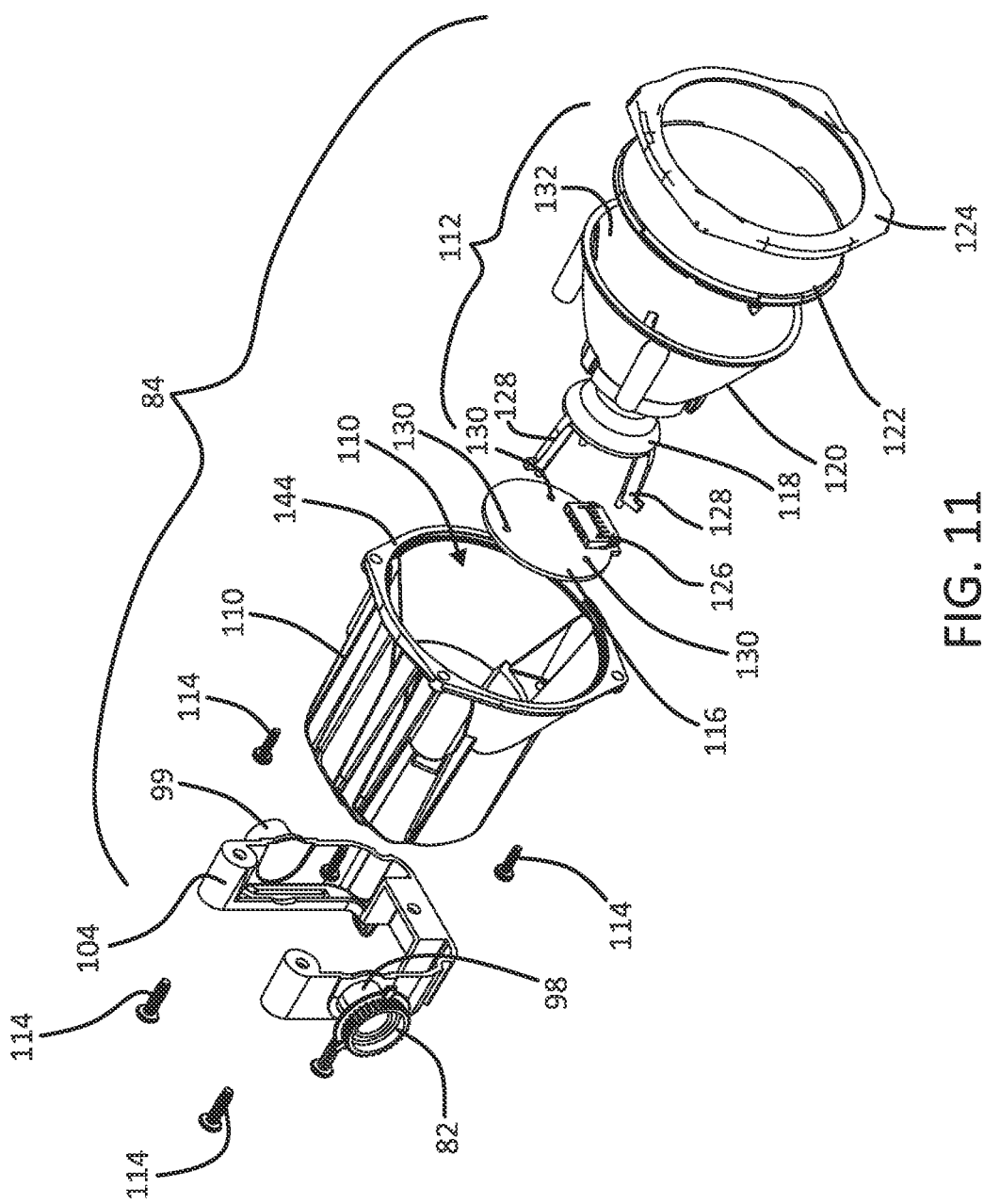
FIG. 11 is a partially exploded view of the subunit of FIG. 10.

Various embodiments of the present inventions will be described in detail with reference to the drawings, wherein like reference numerals represent like parts and assemblies throughout the several views. Reference to various embodiments does not limit the scope of the inventions, which are limited only by the scope of the claims attached hereto. Additionally, any examples set forth in this specification are not intended to be limiting and merely set forth some of the many possible embodiments for the claimed inventions.

In general terms, a lighting unit of the present disclosure is configured to illuminate work sites and other areas. The lighting unit can be mounted to a vehicle, such as a construction vehicle, utility vehicle, or emergency vehicle. The beam configuration of the lighting unit is electronically adjustable without requiring mechanical or moving parts, which can provide for a more robust and compact lighting unit that is less likely to require repair of mechanical parts. The beam configuration is electronically adjustable to increase and decrease the spread of the light beam propagating from the lighting unit. The spread can be adjusted to a specific application or use requirement.

For example, a narrow beam can be used to shine light on a relatively small area or a particular object (e.g., another vehicle that requires towing), while a wider beam can be used as a flood light to illuminate a larger area, such as a construction site. In some examples, the beam configuration is electronically adjustable to also adjust the direction of the beam propagating from the lighting unit, the direction of the beam being defined by the center of the beam spread. In some examples, the lighting unit includes one or more mechanical drivers to mechanically adjust the beam direction.

A command interface can be provided to provide control commands to a controller of the lighting unit to control the beam configuration and the beam direction. The interface can be operatively connected to the lighting unit through a wired or wireless connection. In some examples, one or more predefined beam directions and/or one or more predefined beam configurations can be stored in a memory. The memory is accessed (e.g., via a selection provided by the command interface) to automatically adjust the beam configuration and/or beam direction to the predefined beam configuration and/or beam direction.

FIG. 1 is a schematic illustration of an example lighting unit system 10 according to the present disclosure.

The system 10 includes a lighting unit 12 connected to a power supply 26. The power supply 26 can be configured to provide alternating electrical current or direct electrical current. In some examples, the lighting unit 12 includes a converter for converting alternating current to direct current for powering components of the lighting unit 12, such as a step motor. In some examples, the power supply 26 includes a battery of a vehicle to which the lighting unit 12 is mounted. In some examples, the power supply 26 includes a battery positioned within the housing of the lighting unit.

The lighting unit 12 can receive control commands from a command interface 28 via a wired connection, or via a wireless network, such as the network 2. The network 2 can include one or more of a local area network, a wide area network, a near field communication network, such as a Bluetooth® enabled network, an ethernet enabled network, a cellular enabled network, a satellite enabled network, etc.

In some examples, information from the lighting unit 12 can be supplied to the command interface 28 via the network 2. Such information can include, for example, operating status information, fault information, beam spread and beam direction information, etc.

The lighting unit 12 includes a controller 22 that receives commands from the command interface 28 for controlling beam configuration and beam direction of the lighting unit 12. The controller 22 is also configured to access the memory 20, which can be an integrated component of the lighting unit 12 (as shown) or, alternatively, positioned remotely from the lighting unit 12 and accessed using the network 2. The controller 22 can include one or more processors that process computer-readable instructions, and firmware for generating control signals that can be sent by the controller 22, and received by the driver(s) 24, the light emitter 14, the adjustable mount 16, and the electronically adjustable refractive element 18.

The memory 20 stores software that the controller executes to provide control signals to other components of the lighting unit 12.

The memory 20 can also store predefined beam spread configuration and beam directions. The controller 22 can access a predefined spread configuration or beam direction to generate control signals that cause the adjustable mount 16 to move to a predefined position corresponding to the predefined beam direction, and/or to cause the electronically adjustable refractive element 18 to adjust the spread of the beam emitted by the light emitter 14 to the corresponding predefined spread configuration.

The electronically adjustable refractive element 18 is configured to be electronically controlled to adjust a beam configuration of a beam emitted by the light emitter 14. The light emitter 14 can be a solitary light generator a plurality of light generators. The light generator(s) can include any suitable light generator, such as a halogen bulb, an incandescent bulb, a fluorescent bulb, or a light emitting diode (LED). The light emitter 14 can be configured to generate light of any desired intensity. In some examples, the light emitter 14 is configured to emit light having an intensity in a selectable range, or at predefined values within a range, the range being between 5,000 to 10,000 lumens, or outside of this range (e.g., 1,000 to 20,000 lumens). The light emitter 14 can be configured to generate a single light color or multiple selectable light colors. One or more filters and/or other optical elements can also be provided to alter the color and/or polarization of the light propagating from the lighting unit 12. The light emitter 14 can include an array of multiple light sources which can be selectively activated to generate a beam of a desired configuration, color, polarization and intensity. In some examples, the light emitter 14 includes one or more LEDs and is configured to generate light of different selectable colors and different selectable intensities in a range of 0 to 10,000 lumens, or more.

The light emitter 14 can be configured to emit a default beam configuration. For example, the default beam configuration can span about a 3 degree arc (about 1.5 degrees on either side of the beam direction). When the refractive element 18 is uncharged, the beam is not refracted (or is refracted by a deminimus amount) as it passes through the refractive element 18, such that the default beam configuration is unchanged or substantially unchanged by the refractive element 18.

The controller 22 sends beam modulation signals to the refractive element 18, which cause the refractive element 18 to refract and/or redirect the incident default beam from the light emitter 14. The refractive element 18 can cause the beam to spread and/or deflect. For example, the refractive element 18 can cause the default beam to at least double in spread, or at least triple in spread, or at least quadruple in spread. The number of selectable spread configurations between minimum and maximum spread can be virtually infinite. Likewise, the number of selectable beam deflections away from the default direction can be virtually infinite.

In some examples, the refractive element 18 includes a layer of liquid crystal molecules that change orientation upon introduction of an electric field. The refractive element 18 can include electrodes sandwiching the layer of liquid crystal molecules and generating a spatially differentiated electric field across the layer of liquid crystal molecules, thereby changing the refractive index of at least portions of the layer of liquid crystal molecules, which in turn causes the beam configuration or direction to change. For example, to modify the beam spread, a differentiated electric filed is generated such that the refractive index of the refractive element 18 increases with radial distance from the center of the default incident beam on the refractive element.

Examples of functionality and composition of such refractive elements are described in U.S. Patent Application Publication No. 2011/0090415, the contents of which are hereby incorporated by reference in its entirety. Non-limiting examples of the refractive element 18 are any of the LensVector® dynamic beam shaping lenses provided by LensVector of San Jose, Calif.

Referring to FIGS. 2-11, example structural components of the lighting unit 12 from the system 10 of FIG. 1 will be described.

The lighting unit 12 defines a central axis 42. Typically, the central axis 42 will be perpendicular to the surface to which the lighting unit 12 is affixed, such as a roof of a vehicle on an exterior of a vehicle or above a dashboard in an interior of a vehicle. The lighting unit extends from a bottom 44 to a top 46 along the central axis 42.

The lighting unit 12 includes a base 48, and a cover 50 that mounts to the base 48, e.g., in a rotationally locking manner. For example, ratchet teeth 56 of the cover 50 can lockingly engage a pawl 58 of the base 48. The base 48 and the cover 50 define an interior volume 49 in which are housed various components of the lighting unit 12. A sealing element 61 (e.g., an elastomeric ring) can be positioned to form a seal between the cover 50 and the base 48 to inhibit ingress of potentially damaging contaminants into the interior volume 49, such as dust or moisture. In the example shown, the central axis 42 runs parallel to the longitudinal dimension of the cover 50. In some examples, the central axis of the lighting unit coincides with the longitudinal dimension of the cover, which coincides with a central longitudinal axis defined by the cover, which in turn coincides with the rotation position axis.

The cover 50 is a domed structure with a cylindrical or frusto-conical side wall 52 circumferentially surrounding the central axis 42. At least a portion of the cover 50 is transparent such that light from the lighting unit's light emitter housed within the interior volume can propagate through the side wall 52 to the lighting unit's exterior.

The base 48 can be configured to be mounted to a vehicle. For example, a threaded coupler 59 can be threadably secured to a stand that is mounted to a vehicle surface.

One or more wires 54 extend through the base 48. The one or more wires 54 can provide power and/or carry signals to a controller of the lighting unit 12. The controller can be a locally positioned component within the interior volume defined by the cover and base. Alternatively, the controller can be a remotely positioned component. The one or more wires 54 can be operably coupled to a remote power supply (such as a vehicle's battery). The one or more wires 54 can be operatively coupled to a command interface, such as the command interface 28 (FIG. 1).

A subunit 60 is mounted to the base 48 and housed within the interior volume 49. The subunit 60 includes a stand 62. The stand 62 includes a base portion 64 and arm portions 66 and 68 extending from the base portion 64. The arm portion 66 houses cogwheels 74 and 76 that are operatively coupled to a worm screw 70 of a first motor 72, e.g., a step motor. The first motor 72 is mounted to a control board 78 of a control unit 80 that is housed in the base portion 64 of the stand 62. The cogwheel 76 is operably coupled to the cogwheel 82 of the light emission assembly 84. For example, a belt 87 operatively couples the cogwheels 76 and 82 such that rotation of the cogwheel 76, which is caused by rotation of a driver driven by the motor 72, causes the light emission assembly 84 to pivot about the pivot axis 86.

In this example, the driver is a worm screw 70. The pivot axis 86 is perpendicular to the central axis 42. The pivot axis 86 is a tilt position axis for the light emission assembly 84. In this manner, the tilt direction of the light beam generated by the light emission assembly 84 can be adjusted relative to the central axis 42. Discrete selectable positions for the tilt direction of the light beam can be stored in the memory 20 (FIG. 1). A stored tilt position can be selected via the command interface, causing the motor 72 to drive the light emission assembly 84 to the selected, predefined and stored tilt position.

The motor 72 can be powered by the power supply 26. For example, the wires 54 can convey electricity to the control board 78. The wires 54 are terminated in an electrical connector 94 that engages a socket 97 attached to the control board 78. From the socket 97, power can be routed to other components mounted to the control board 78, such as the motors 72 and 88, and circuitry, as well as electronic control components of the lighting unit 12, such as processor(s), non-transitory computer readable storage storing software, and firmware.

A second motor 88 (e.g., a step motor) is mounted to the control board 78. The second motor 88 can be powered by the power supply 26. The second motor 88 drives rotation of a cogwheel 90 that rotationally interfaces with a toothed ring 92 (having teeth 93) positioned in the base 48 to thereby rotate the subunit 60 relative to the base 48 about a rotation position axis that coincides with the central axis 42. In this manner, the radial direction of the light beam generated by the light emission assembly 84 can be adjusted relative to the central axis 42. Discrete selectable positions for the radial direction of the light beam can be stored in the memory 20 (FIG. 1). A stored radial position can be selected via the command interface, causing the motor 88 to drive the light emission assembly 84 to the selected, predefined and stored radial position.

The light emission assembly 84 includes a heat sink 96. Projecting from the heat sink 96 are pegs 98 and 99. The cogwheel 82 is attached to the peg 98. The cogwheel 82 is rotationally received in the socket 100 of the stand 62. The peg 99 is rotationally received in the opposite socket of the stand 62. The pegs 98 and 99 project from a heat sink collar 104 attached to the heat sink 96. The heat sink collar 104 can be constructed of a heat insulative material, such as a polymeric material. Alternatively, the heat sink collar can be integral with the heat sink 96 and/or constructed of the same material (e.g. a metal such as an aluminum alloy) as the heat sink 96.

Additional components of the light emission assembly 84 will now be described.

The heat sink 96 defines a cavity 110 that houses a light and optics assembly 112. Components of the light emission assembly 84 can be assembled using fasteners, such as screws 114.

The light and optics assembly 112 includes a light emitter mount 116, a light emitter 118, and an optics arrangement. The optics arrangement includes a reflective element 120, and an electronically adjustable refractive element 122. The light and optics assembly 112 also includes a collar 124.

The light emitter 118 is mounted to the light emitter mount 116, e.g., by inserting legs 128 into receivers 130, which can receive the legs 128 by interference fit or frictional fit. Sockets 126 are also mounted to the mount 116. The sockets 126 can receive connectors that terminate wires routed from the control board 78, as well as wires that are routed from the control board 78 to the light emitter 118 and wires (e.g., the wires 150) that are routed from the control board 78 to the refractive element 122, to thereby provide power and control signals to the light emitter 118 and the refractive element 122.

The light emitter 118 can have any of the properties of the light emitter 14 described above with reference to FIG. 1, and can include any number and type of suitable light generators. In some examples, the light emitter 118 include one or more LEDs.

The refractive element 122 can have any of the properties of the electronically adjustable refractive element 18 described above.

The reflective element 120 includes a parabolically shaped reflective surface 132 configured to focus light emitted by the light emitter 118 into a default beam configuration with a central optical axis 112.

The central optical axis 112 defines the direction of the beam (i.e., the beam direction) generated by the light emitter 118 as it propagates outward from the refractive element 122. The default beam configuration can span about a 3 degree arc (about 1.5 degrees on either side of the central optical axis 112). When the refractive element 122 is uncharged, the beam is not refracted (or is refracted by a deminimus amount) as it passes through the refractive element 122, such that the default beam configuration is unchanged or substantially unchanged by the refractive element 122. By controlling the refractive element 122, the beam configuration can be manipulated by spreading the beam about the central optical axis 112 and/or deflecting the beam. Spreading the beam does not cause the central optical axis to move relative to the assembly 84. Deflecting the beam causes the central optical axis 112 to rotate relative to the assembly 84.

For example, by controlling the refractive element 122 using a spatially differentiated electric field, the default beam can be adjusted to at least double in spread, or at least triple in spread, or at least quadruple in spread, or more. For example, the beam spread can be increased from about 3 degrees or less to at least 10 degrees, at least 15 degrees, or more. The number of selectable spread configurations between minimum and maximum spread can be virtually infinite. Likewise, the number of selectable beam deflections away from the default direction can be virtually infinite. In some examples, one or more predefined beam directions and/or one or more predefined beam configurations can be stored in a memory as described herein. As described herein, the memory is accessed (e.g., via a selection provided by the command interface) to automatically adjust the beam configuration and/or beam direction to the predefined beam configuration and/or beam direction.

The collar 124 serves to secure other components of the light and optics assembly 112 to the heat sink 96. The collar 124 interfaces with the attachment surface 144 of the heat sink 96.

Figure 12:
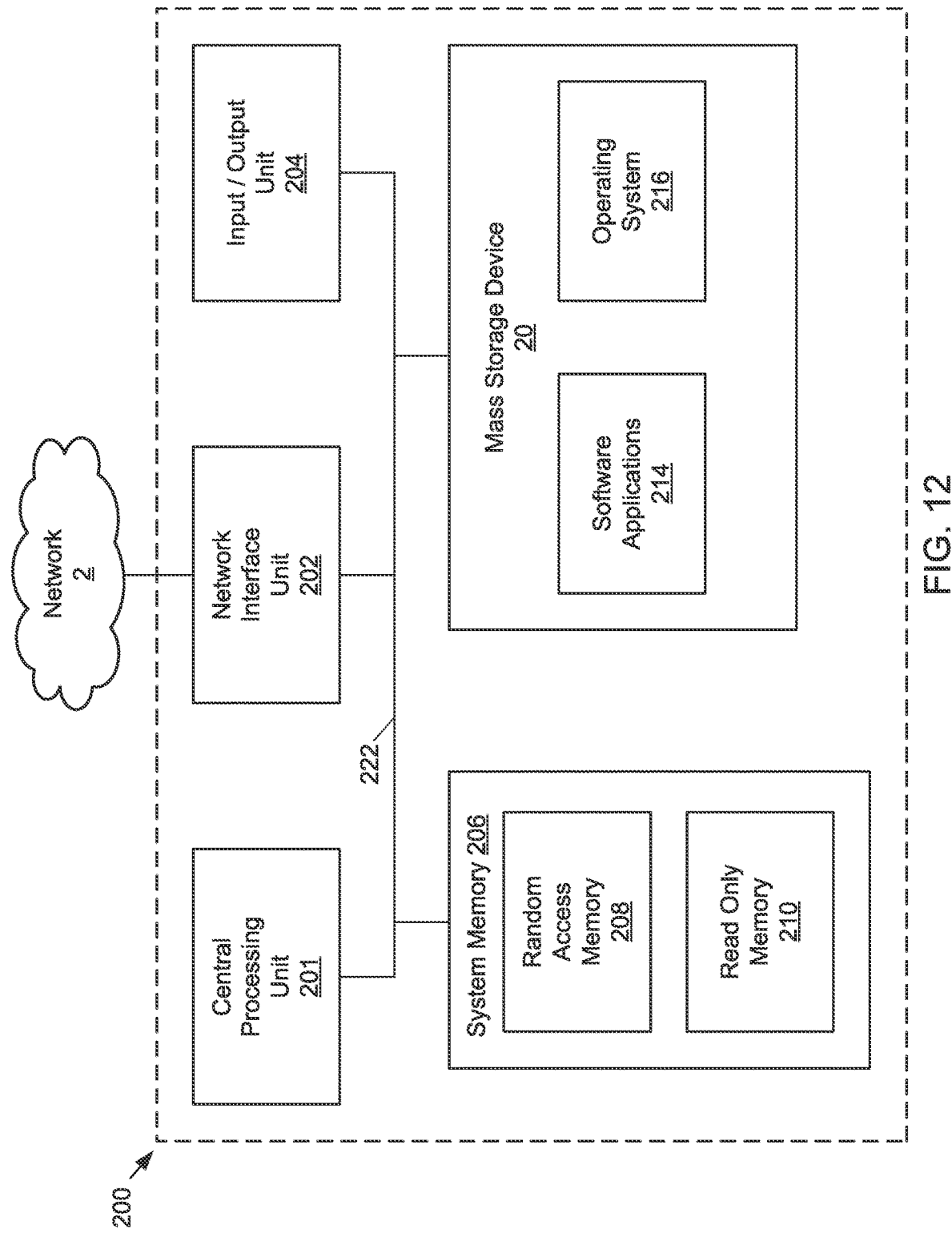
FIG. 12 schematically shows example computing components of the system of FIG. 1.

As illustrated in the example of FIG. 12, additional details about the example computing subsystem 200 of the lighting unit 12 of FIG. 1 are shown. All components or some components of the computing subsystem 200 can physically reside on the control board 78 (FIG. 9) and/or remote therefrom and accessed via the network 2.

The computing subsystem 200 provides the computing resources to run the system 10 (FIG. 1). Via the network 2, the computing subsystem 200 can interact with other computing equipment, such as the command interface 28 (FIG. 1).

The computing subsystem 200 includes at least one central processing unit ("CPU") 201 that is at least one component of the controller 22 (FIG. 1), a system memory 206, and a system bus 222 that couples the system memory 206 to the CPU 201. The system memory 206 includes a random access memory ("RAM") 208 and a read-only memory ("ROM") 210. A basic input/output system that contains the basic routines that help to transfer information between elements within the computing subsystem 200, such as during startup, is stored in the ROM 212. The computing subsystem 200 further includes a mass storage device 20. The mass storage device 20 is able to store software instructions and data, such as software instructions and data required to operate the lighting unit 12 (FIG. 1).

The mass storage device 20 is connected to the CPU 22 through a mass storage controller (not shown) connected to the system bus 222. The mass storage device 20 and its associated computer-readable data storage media provide non-volatile, non-transitory storage for the computing subsystem 200. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing subsystem 200.

According to various embodiments of the invention, the computing subsystem 200 may operate in a networked environment using logical connections to remote network devices through the network 2, such as a wireless network, the Internet, or another type of network, as described herein. The computing subsystem 200 may connect to the network 2 through a network interface unit 202 connected to the system bus 222. It should be appreciated that the network interface unit 202 may also be utilized to connect to other types of networks and remote computing systems. The computing subsystem 200 also includes an input/output unit 204 for receiving and processing input from a number of other devices, including a touch user interface display screen, or another type of input device such as the command interface 28 (FIG. 1).

As mentioned briefly above, the mass storage device 20 and the RAM 208 can store software instructions and data. The software instructions include an operating system 216 suitable for controlling the operation of the computing subsystem 200. The mass storage device 20 and/or the RAM 208 also store software instructions and applications 214, that when executed by the CPU 201, cause the computing subsystem 200 to provide the functionality of the lighting units described herein.

The description and illustration of one or more embodiments provided in this application are not intended to limit or restrict the scope of the inventions as claimed in any way. The embodiments, examples, and details provided in this application are considered sufficient to convey possession and enable others to make and use the best mode of claimed inventions. The claimed inventions should not be construed as being limited to any embodiment, example, or detail provided in this application. Regardless whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed inventions and the general inventive concept embodied in this application that do not depart from the broader scope.

What is claimed is:

1. A lighting unit, comprising:
   a base;
   a cover couplable to the base to define an interior volume of the lighting unit, the cover being configured to transmit light from the interior volume to an exterior of the lighting unit;
   a subunit positioned within the interior volume and arranged to pivot relative to the base and the cover about two pivot axes that are perpendicular to each other, the subunit defining a central optical axis and including:
      a light emitter; and
      an optics arrangement, including an electronically adjustable refractive element; and
   a controller configured to electronically modify refractive properties of the refractive element to increase or decrease a maximum beam width perpendicular to the central optical axis of a light beam at the cover, the light beam being generated by the light emitter.

2. The lighting unit of claim 1,
wherein the refractive element includes electrodes and a layer of liquid crystal molecules; and
wherein the controller is configured to spatially modulate, using the electrodes, a differential electric field at the layer of liquid crystal molecules to increase or decrease the maximum beam width of the light beam at the cover.

3. The lighting unit of claim 2, wherein when the electrodes are not generating the differential electric field at the layer of liquid crystal molecules, the maximum beam width of the light beam about the central optical axis at the cover is a minimum width.

4. The lighting unit of claim 3, wherein the minimum width spans an angle that is less than four degrees.

5. The lighting unit of claim 3, wherein the minimum width spans an angle that is about three degrees.

6. The lighting unit of claim 3, wherein the minimum width spans an angle that is less than three degrees.

7. The lighting unit of claim 3, wherein adjustment of the differential electric field, using the controller, causes the maximum width at the cover to increase.

8. The lighting unit of claim 3, wherein adjustment of the differential electric field, using the controller, causes the maximum beam width at the cover to increase up to a width spanning an angle of at least 10 degrees.

9. The lighting unit of claim 8, wherein the maximum beam width at the cover spans an angle that is greater than 15 degrees.

10. The lighting unit of claim 1,
wherein the pivot axes include a rotation position axis and a tilt position axis;
wherein the central optical axis is perpendicular to the tilt position axis;
wherein the lighting unit comprises at least one driver configured to independently pivot the subunit:
about the rotation position axis to each of a plurality of selectable rotation positions of the central optical axis; and
about the tilt position axis to each of a plurality of selectable tilt positions of the central optical axis.

11. The lighting unit of claim 10, wherein the at least one driver includes a step motor.

12. The lighting unit of claim 10, wherein the at least one driver is configured to be controlled by the controller.

13. The lighting unit of claim 10, wherein one or more of the plurality of selectable rotation positions and/or one or more of the plurality of selectable tilt positions are stored in a computer readable non-transitory memory.

14. The lighting unit of claim 10, further comprising an interface for providing commands received by the controller for adjusting the refractive element, the rotation position, and the tilt position.

15. The lighting unit of claim 14, wherein the interface is configured to provide the commands, and the controller is configured to receive the commands, via a wireless network.

16. The lighting unit of claim 13, wherein the controller is configured to retrieve one of the stored selectable tilt positions and/or one of the stored selectable rotation positions and cause the subunit to pivot to the retrieved one of the selectable tilt positions and/or the retrieved one of the selectable rotation positions.

17. The lighting unit of claim 1,
wherein the pivot axes include a rotation position axis and a tilt position axis;
wherein a longitudinal axis defined by the cover coincides with the rotation position axis;
wherein the cover fully circumferentially surrounds the rotation position axis; and
wherein an entirety of at least a strip of the cover fully circumferentially surrounding the rotation position axis is transparent.

18. The lighting unit of claim 1, wherein the light emitter includes a light emitting diode.

19. The lighting unit of claim 1, wherein the optics arrangement includes a reflector that reflects light emitted by the light emitter towards the central optical axis.

20. A system, comprising:
a vehicle; and
a lighting unit mounted to the vehicle, the lighting unit including:
a base;
a cover couplable to the base to define an interior volume of the lighting unit, the cover being configured to transmit light from the interior volume to an exterior of the lighting unit;
a subunit positioned within the interior volume and arranged to pivot relative to the base and the cover about two pivot axes that are perpendicular to each other, the subunit defining a central optical axis and including:
a light emitter; and
an optics arrangement, including an electronically adjustable refractive element; and
a controller configured to electronically modify refractive properties of the refractive element to increase or decrease a maximum beam width perpendicular to the central optical axis of a light beam at the cover, the light beam being generated by the light emitter.

* * * * *